May 8, 1962   C. O. SLEMMONS ETAL   3,033,558
SINGLE PISTON AIR SPRING WITH FLOATING BAND
Filed Dec. 11, 1958   4 Sheets-Sheet 1

INVENTORS
Charles O. Slemmons
John A. Welch
BY McCoy, Greene & Te Grotenhuis
ATTORNEYS INVENTORS
Charles O. Slemmons
John A. Welch
BY McCoy, Greene & Grotenhuis
ATTORNEYS

United States Patent Office 3,033,558
Patented May 8, 1962

3,033,558
SINGLE PISTON AIR SPRING WITH FLOATING BAND
Charles O. Slemmons and John A. Welch, Akron, Ohio, assignors to The General Tire & Rubber Company, Akron, Ohio, a corporation of Ohio
Filed Dec. 11, 1958, Ser. No. 779,627
5 Claims. (Cl. 267—65)

The present invention relates to improved air springs or pneumatic suspension devices for use in automobile and other vehicle suspension systems.

While it has long been recognized that air springs possess certain inherent advantages over suspension devices, such as coil springs and leaf springs, air springs are not at present in general use in automobiles and other vehicles because of certain problems of design, cost, and construction which have to be overcome.

One problem is to control the characteristics of the air spring and at the same time provide means for maintaining alignment or allowing for misalignment between the top and bottom air spring members as they work up and down from the full jounce position to the full rebound position. For example, if an air spring is to be incorporated in the front end suspension system of an automobile in place of a coil spring, means must be provided to maintain alignment between the top and bottom air spring members or allow for misalignment.

Another problem is to provide an air spring capable of being incorporated in automobile suspension systems in the space presently allocated to coil springs. In order to accomplish this result, the air spring must have a large capacity in a small space.

The object of the present invention is to provide air springs which overcome the above and other problems so as to be readily incorporated in automobile suspension systems in place of coil springs and leaf springs and otherwise be readily adaptable to vehicle suspension systems.

Other objects and advantages will become apparent from the following description of the invention in which like numerals relate to like parts throughout the several views. Referring to the drawings, FIGURE 1 is a side elevation mostly in cross-section of an air spring of the present invention disposed between a vehicle frame and vehicle undercarriage in the normal load position;

The present invention comprises a circular air spring having an elongated piston member mounted on the undercarriage, rubber bellows sealed to the edges of the face of the piston and to the frame to define a main air chamber, and a floating band attached to the bellows and surrounding and constraining it.

Figure 1:
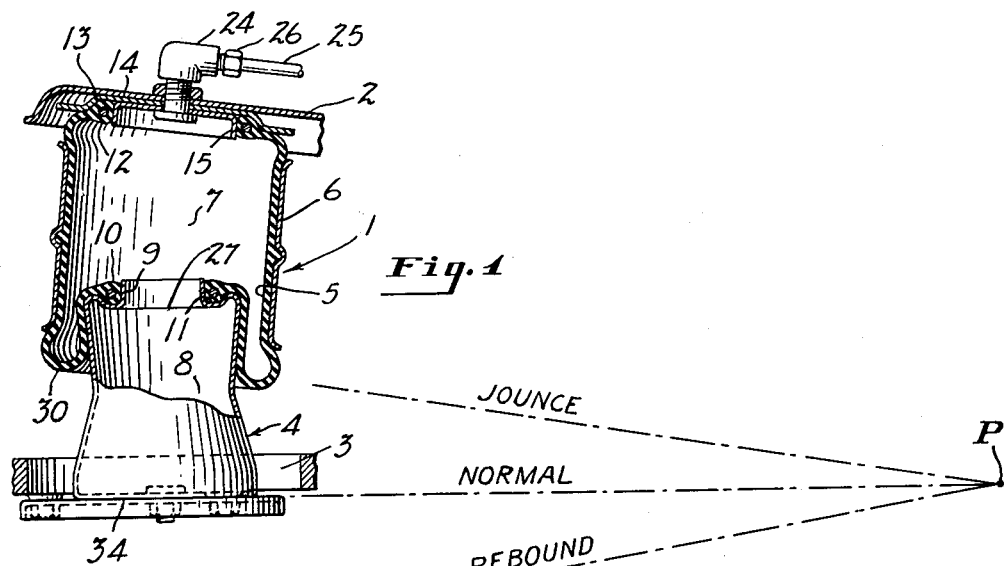

Referring to FIG. 1, an air spring unit 1 is shown mounted between a vehicle frame or chassis 2 and a vehicle undercarriage 3. The undercarriage 3 pivots about a point P to the right of FIG. 1 and moves over an arcuate path toward and away from the chassis 2.

A piston member 4 is mounted on the undercarriage and directed upwardly toward the frame. A bellows 5 is sealed to the edges of the face of the piston and the frame to thereby define a main air chamber 7. Surrounding the bellows is a floating band 6 which is nearly coextensive in height with the bellows along the longitudinal axis thereof and is preferably symmetrical about the median plane thereof. This forms an arrangement akin to a frictionless piston and cylinder which is called a rolling diaphragm.

FIG. 1 represents the unit in the normal load position. In this position, the band extends up close to the frame and appreciably down past the piston shoulder 28 so that the bottom of the lowest piston bellows loop 30 is in approximately the same plane as a horizontal plane through the piston neck portion 17.

The cylindrical constraining band or restrictor 6 surrounding the bellows is floating and, except for the bellows, is unattached to other elements of the unit. It reciprocates with the movement of the undercarriage piston member and provides the means for compensating for misalignment between the top and bottom pistons while limiting the diameter of the unit to maintain the characteristics of an air spring. The band 6 may be welded from light gauge sheet metal, forged, or otherwise formed as desired. It is held in position on the bellows by a central groove or corrugation 19 formed in the band which interfits with a corresponding central ridge or bead 20 formed on the outer periphery of the bellows. One or more corrugations and corresponding ridges or other means may be provided as necessary to hold the band in position on the periphery of the bellows. The edges 21 of the band are rounded so that they do not cut into the bellows.

Figures 2, 3:
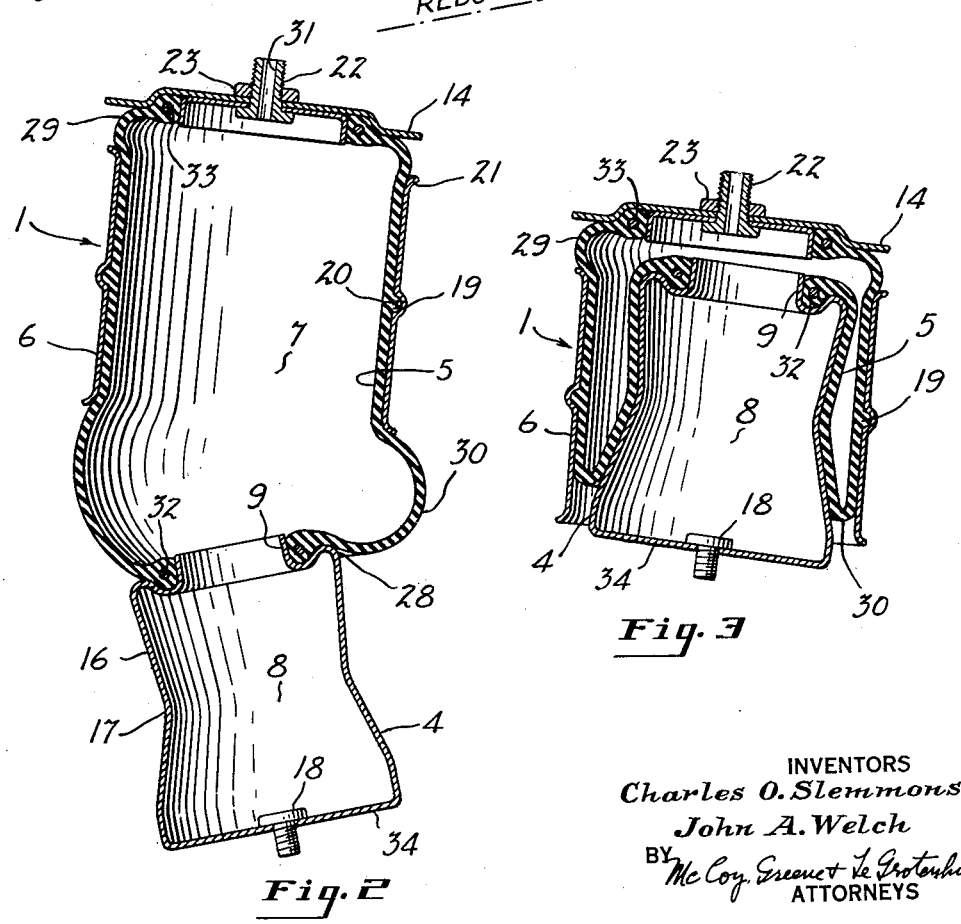
FIG. 2 is a side elevation in cross-section of the air spring of FIG. 1 in the full rebound position.
FIG. 3 is a side elevation in cross-section of the air spring of FIG. 1 in the full jounce position.

The band must have appreciable length so as to accommodate the piston members as they reciprocate within it. Likewise, the face of the piston member should extend into the band so as to operate and reciprocate within it throughout most of the operating cycle of the unit. As the unit approaches full rebound, however, the face of the piston member may be outside the band as is shown in FIG. 2.

The main air chamber 7 is defined by the bellows 5, the dished piece 15 on the frame, and the piston face 27. The auxiliary chamber 8 is defined by the inside of the piston and the piston face. An opening 9 formed in the piston face 27 connects the two chambers and together they form the compression chamber for the unit. The air pressure of the unit is maintained at a pressure which is preferably within the range of 20–100 p.s.i. and is provided through air supply line 25. It is contemplated that even higher air pressures in the range of 100 p.s.i. to 200 p.s.i. or more may be employed with the air spring of the present invention. The air spring unit of the present invention can be designed to give frequencies as low as 30 cycles per minute when a large compression chamber is used.

As molded and prior to assembly, the bellows is cylindrical in shape with convexly rounded top and bottom portions. When assembled, the top and bottom portions are pushed in and reversed to form the central dished-in end portions and annular beaded portions shown. The shape should be such that folds are not formed in the annular rolling diaphragm portions or loops 29 and 30 as the air spring unit works up and down. The bellows is molded of rubber similar in composition to automobile tire rubbers and is preferably reinforced with weftless fabric, one ply crossing the other at an angle of 15–30°. Rayon, nylon, or other cord fabric may be used as desired. The bellows must be air-tight and resistant to oil and other solvents likely to be encountered in operation.

Bead 10 is provided in the bottom end of the bellows and is adapted to fit into bead seat or shoulder 11 in the face of the piston member. Bead 12 is provided in the top end of the bellows and fits in bead seat 13 formed by outer dish piece 14 and inner piece 15 as shown. Beads 10 and 12 are built around bead wires 32 and 33 which are solid wires butt-welded at the joint. Bead wires similar to those used in pneumatic tires may also be employed. Threaded fitting 22 holds the dish pieces together and in position when nut 23 has been tightened up as shown. This fitting also defines an air supply line hole 31. An elbow 24 is connected to the fitting 22 and air supply tube 25, nut 26 furnishing an air-tight connection. Attaching bolt 18 attaches the piston to the undercarriage.

The profile of the piston 4 is inwardly relieved or constricted in an hourglass shape so as to form a narrow neck portion 17 at the middle thereof and a wide base 34. The base of the piston has a greater diameter or lateral dimension than the face of the piston so as to increase the effective area as the piston approaches full jounce or maximum deflection. The middle portion of the piston has a smaller diameter or lateral dimension than the face so as to decrease the effective area as the piston moves from rebound toward full jounce over the middle range of operation. This piston contour, combined with the shape and location of the floating band, provides a unit which has an effective area v. deflection curve which reverses and forms one of the principal characteristics of the present invention.

FIG. 2 shows the unit of FIG. 1 in full rebound. As is apparent, the piston is outside the band. The bottom loop 30 is not confined between the piston and band and at this point is quite full. FIG. 3 shows the unit of FIG. 1 in full jounce. Here the piston is almost wholly within the band and the bottom loop 30 is very small and pinched.

Figure 4:
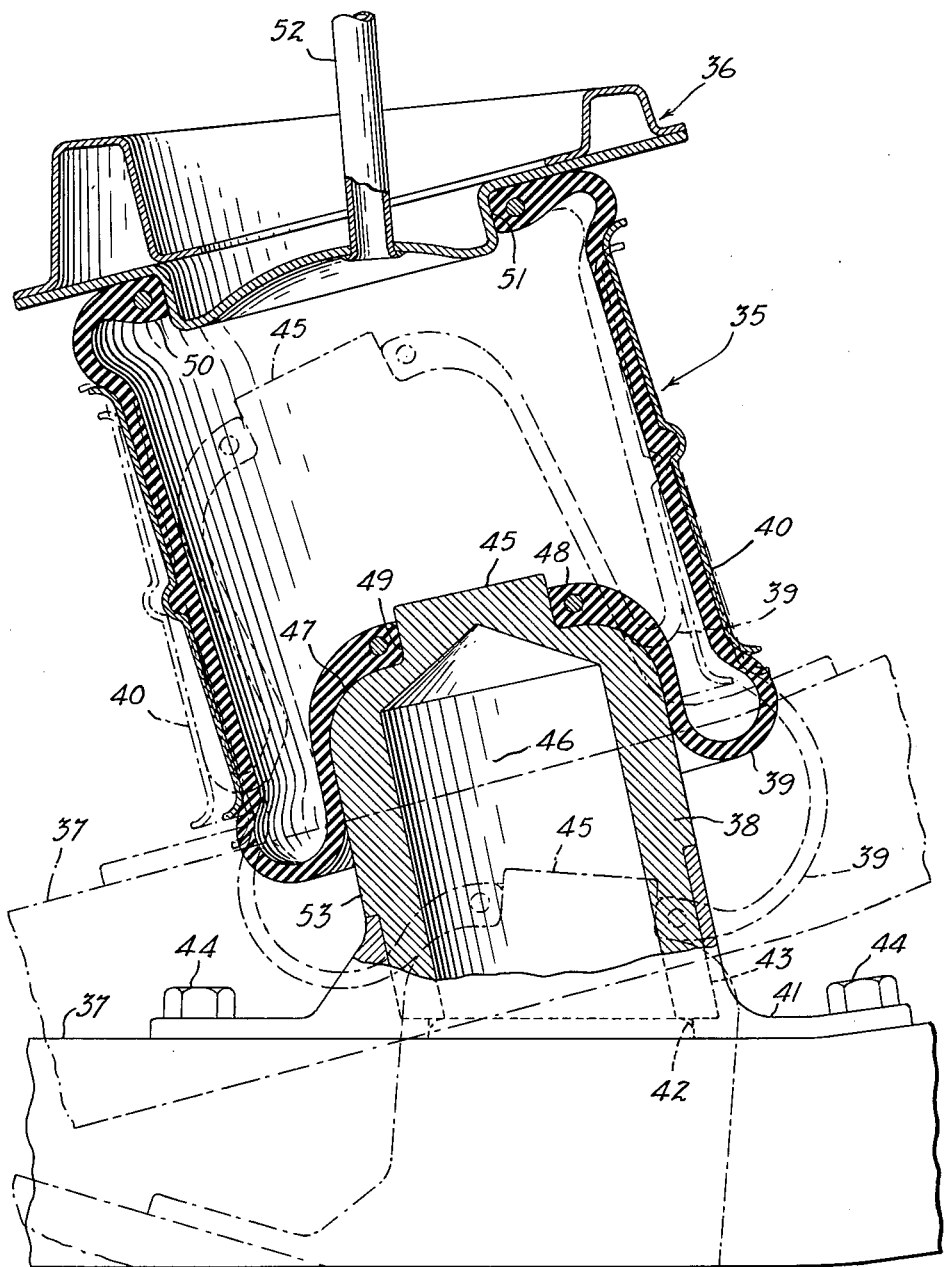
FIG. 4 is a side elevation in cross-section of a modified form of air spring in which phantom views of the unit in full jounce and full rebound are imposed on the view of the unit in the normal load position to illustrate the action thereof.

FIG. 4 illustrates a second modification of the present invention. This unit has a piston which is cocked away from the vertical to compensate for its position on the undercarriage and has straight sidewalls. It also has a closed piston face and an auxiliary air chamber (not shown) which is mounted on the vehicle frame. In other respects, this unit is similar in action and operation to the unit of FIG. 1.

Referring to this unit, a piston 38 is mounted on undercarriage 37. The bottom bead 48 of the bellows 39 fits on shoulder 49 in the face of the piston. Top bead 50 fits on shoulder 51 in the frame 36. Band 40 restrains and controls the bellows. Air line 52 in the frame leads to an auxiliary air chamber which is not shown.

The unit is shown in full jounce in phantom line and in full rebound in phantom line. The purpose of this is to illustrate the action of the unit and particularly the floating action of the band 40 as it adjusts to the unit's motion. The base of the piston is greater than the face to provide an increased effective area in full jounce.

It should be noted that while the connection between the main air chamber and auxiliary air chamber in this unit is substantially unrestricted as in the other units of the present invention, it is not as large in diameter. The auxiliary air chamber is inside the piston and communicates with the main air chamber through a wide-mouthed orifice in the units of FIGS. 1–3 and FIG. 7. The auxiliary air chamber is in the frame in the unit of FIGS. 5–6 but has a large diametered connection or communication with the main air chamber.

Figure 5:
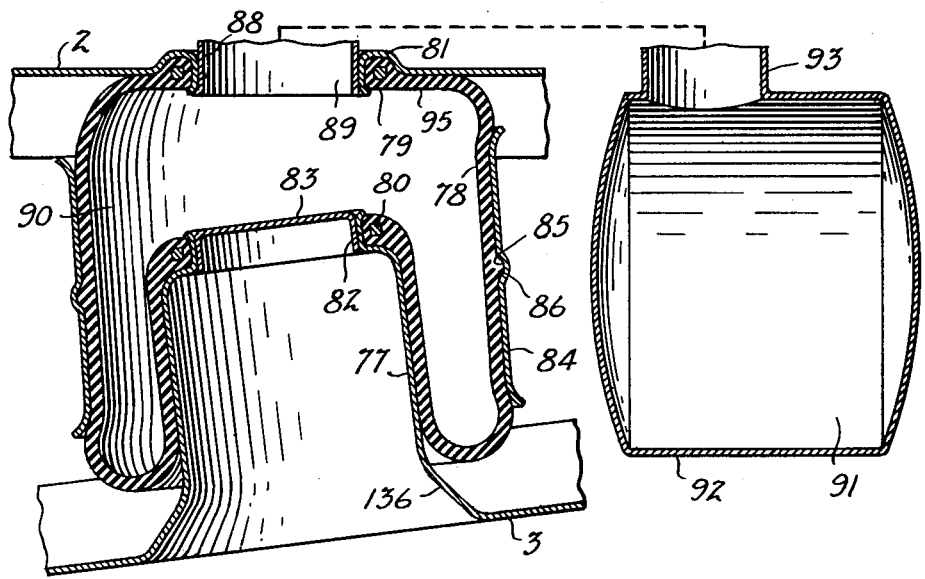
FIG. 5 is a side elevation in cross-section showing a third modified form of air spring.
Figure 6:
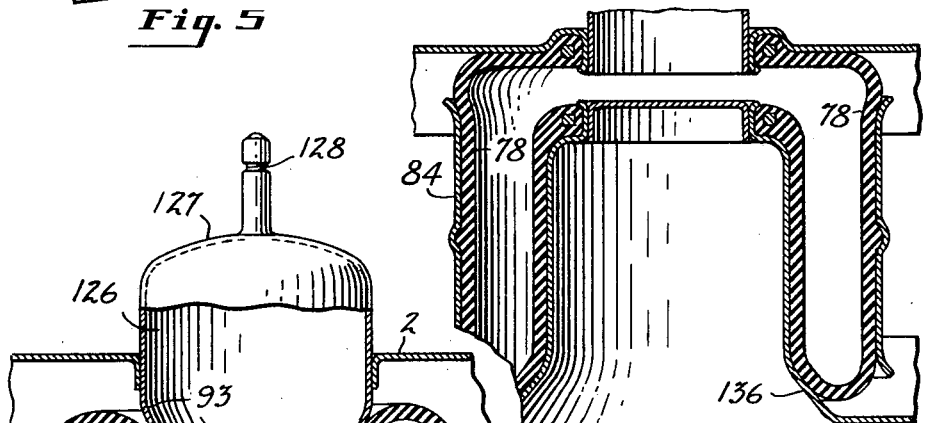
FIG. 6 is a side elevation in cross-section of the modification of FIG. 5 in full jounce.

FIGS. 5 and 6 illustrate still another air spring of the present invention which is characterized by having a single elongated piston member, such as piston 77, having a longitudinal height of the same order as the band and being mounted on the undercarriage or the frame. This arrangement permits use of a small volume auxiliary air chamber and gives a lower frequency than that given by two piston floating band units. At the same time, there is an inherent variation in the effective area which gives spring characteristic curves corresponding to the curves desired by the automobile manufacturers.

Figure 7:
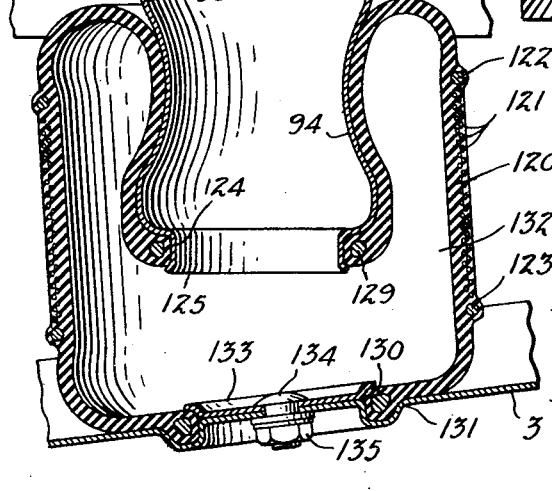
FIG. 7 is a side elevation in cross-section of a fourth modified form of air spring similar to the modification of FIG. 5.

Referring to FIG. 5, an elongated piston 77 is mounted on the undercarriage. The piston may also be mounted on the frame as is shown in FIG. 7. The height of the piston should be such that its face reciprocates within the band throughout the major portion of the operating cycle of the unit from full jounce to full rebound. The piston has substantially the same height as the band but the normal centerline of the piston is closer to the member upon which it is mounted so that the piston and band are offset as shown. If they were not offset, the band would strike the member upon which the piston is mounted in the full jounce position.

It should be noted that an important feature of the air springs of FIGS. 5, 6 and 7 is the fact that they permit considerable annular misalignment between the chassis and undercarriage.

Surrounding the bellows 78 and substantially coextensive therewith is a floating constraining band 84. As noted, the band is positioned on the bellows so that it does not interfere with the chassis or undercarriage in full jounce or in full rebound and has substantially the same height as the piston. Central groove 85 in band 84 interfits with bead 86 in the bellows and thereby holds the band on the bellows. Bead 79 of bellows 78 rests and seals with an annular groove 81 formed in the chassis.

In a similar fashion, bead 80 rests and seals in groove 82 in piston 77. Cylindrical member 88 welded to the chassis defines an orifice 89 in the chassis which leads from the main air chamber 90 into an auxiliary air chamber 91. The main air chamber 90 is defined by the bellows 78 and face 83 of piston 77. The auxiliary air chamber 91 is defined by the cylindrical container 92. An advantage of the subject modification is the fact that the volume of the auxiliary air chamber may be about the same or even less than the volume of the main air chamber. Two piston, floating band units require an auxiliary air chamber which is generally three or four times greater than the volume of the main air chamber.

In the normal load position, piston 77 preferably extends about to the middle portion of band 84. It also should have enough height so that the bottom annular portion of the bellows does not interfere with the chassis in any position.

The length of the band and its placement relative to the piston 77 must be carefully worked out so that the relationship of the edges of the band to the loop formed in the bellows at the side of the piston is correct. The loop should contact the flanged-out corner portion 136 as the piston face 83 approaches the chassis so as to prevent contact between the two. At the same time, the clearance must be minimal so that the overall height of the unit is as low as it can be made. Likewise, the rate of change of effective area must be carefully worked out so that the optimum performance curve is obtained. The rate of change should preferably be such that there is a rapid increase in net effective area as normal load height is approached from full rebound, a decreasing effective area over the middle load positions, and large increase at full jounce. When the air spring of FIGS. 5–7 is properly designed as described, frequencies in the order of 50–70 and as low as 40 cycles per minute can be obtained combined with high capacity and suitable stiffness as full jounce is approached.

FIGURE 7 is a modification similar to that of FIGURES 5 and 6 in which the elongated piston 93 is mounted on the frame instead of the undercarriage and has inwardly curved sidewalls 94 instead of straight sidewalls. In addition, the bellows 120 is provided with a central, cylindrical band of reinforcing substantially inextensible fabric 121 bounded by top and bottom beads 122 and 123 to form a central inextensible portion similar to that formed by the band 84 of FIG. 6. The fabric can be any conventional tire fabric such as rayon or nylon and is incorporated in the bellows similar to a tire carcass in a tire casing. The fabric is preferably at least twice as strong in the direction of the warp threads as in the direction of the weft threads, the warp threads running substantially parallel to the face 125 of the piston 93. Beads 122 and 123 are preferably but not necessarily incorporated in the bellows in the vicinity of the edge of the fabric band to further reinforce and strengthen the unit and provide a constant diameter.

An orifice 124 is formed in the face 125 of piston 93. The orifice opens into the auxiliary air chamber 126 defined by the inner walls of the piston and rounded closing portion 127 at the foot of the piston. Air is supplied to the unit through valve 128.

The bellows 120 is also provided with beads 129 and 130 at the edges thereof which seal with the edges of the face 125 of piston 93 and the bead seats 131 formed in the undercarriage. The bead 130 is sealingly clamped to the undercarriage by clamping member 133, bolt 134 and nut 135 as shown. The portion of the undercarriage enclosed by bead 130, inner walls of bellows 120, and the face and sidewalls of piston 93 define the main air chamber 132.

A unit provided with an integrally reinforced bellows but without a separate can or circumferential supporting member as shown in FIG. 7 is not the full equivalent of the unreinforced bellows and can arrangement of the other modifications because the loop of the bellows cannot withdraw into the can. This may be overcome by providing a vertical separation between the inner and outer portions of the bellows adjacent the edges, but there is always a tendency to enlarge the separation at its central terminals as the unit works. At the same time, the unit of FIG. 7 is suitable in many installations in place of the other modifications described herein. Because the loop of the bellows cannot withdraw into the can, this unit has a straighter curve and variations at the jounce and rebound ends have to be achieved by using shaped pistons as shown.

Figure 8:
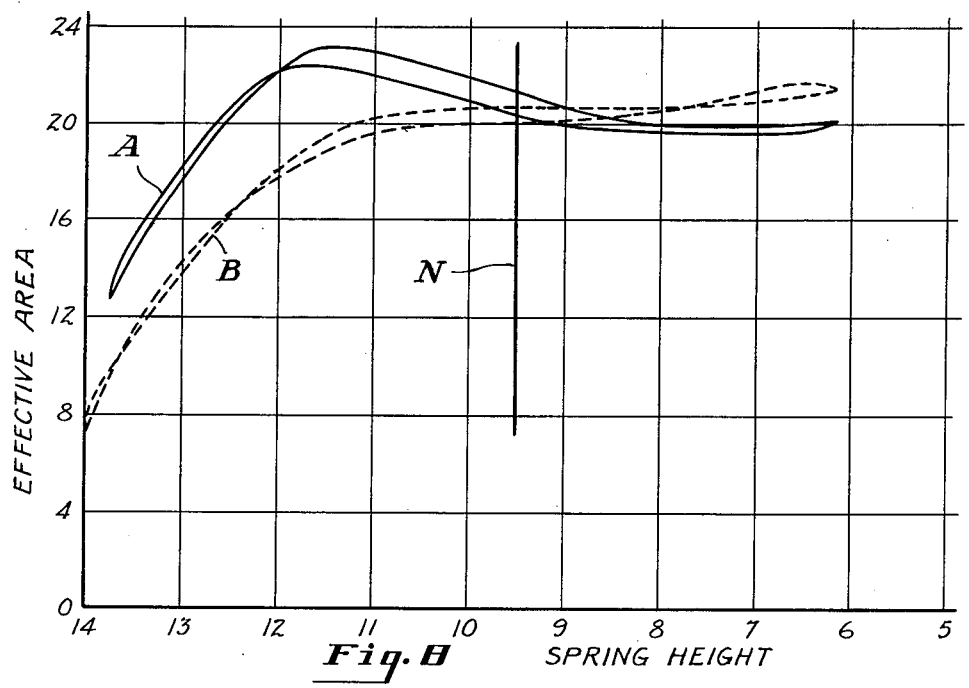
FIG. 8 is a graph of the effective area against spring height for a typical two-piston air spring unit (curve B in dash line) and for the air spring of FIGS. 7 and 8 (curve A in solid line)
Figure 9:
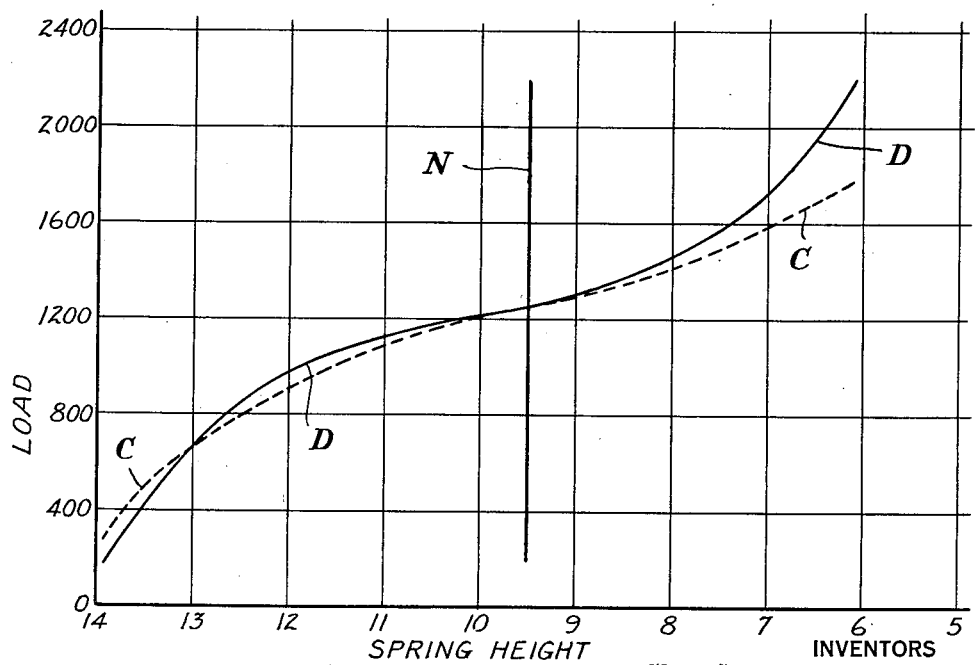
FIG. 9 is a graph of load against spring height for a typical two-piston air spring unit (curve C in dash line) and for the air spring of FIGS. 7 and 8 (curve D in solid line).

FIGS. 8 and 9 are graphs illustrating the characteristics of the air springs of the present invention. FIG. 8 shows the apparent effective area taken under static conditions plotted against spring height for a two piston, floating band air spring and the air spring of FIGS. 5 and 6. Curve A represents the air spring of FIGS. 5 and 6 as it goes from full rebound to full jounce and back again. Curve B represents a two piston, floating band air spring as it goes from full rebound to full jounce and back again. The solid vertical line represents the normal height for curve A and the dotted line represents the normal height for curve B. Full rebound is at the left-hand side of the graph. The apparent effective area is the load divided by the air pressure in the unit.

It is apparent from curve A that the effective area of the piston of FIGS. 5 and 6 is low at full rebound, rises sharply, and then drops rapidly through normal position before the rise at jounce. This gives a soft, high capacity and small volume air spring. Curve B shows the effective area of a two piston, floating band air spring. It is low at full rebound, increases rapidly, levels off over the middle range, and then increases again. For a given total volume, the spring of curve B is stiffer than that of FIGS. 5 and 6.

FIG. 9 shows load plotted against spring height. Curve C is for a two piston, floating band air spring and curve D is for the air spring of FIGS. 5 and 6. The characteristics of each air spring are apparent from the curves. The air spring of curve C has the flattest overall curve because it has the largest volume and two pistons. It is relatively soft at rebound and soft at jounce. The air spring of FIGS. 5 and 6 (curve D) is stiffer than that of FIGS. 1–3 at rebound and at jounce. The design or normal height is indicated by the vertical line N and is the same for all curves. Rebound is at the left-hand side of the design height and jounce is at the right-hand side.

The factors which determine the effective area v. deflection curve are the piston or internal restrictor (including the hourglass piston contour as noted above) the band on external restrictor, the vertical placement of the piston in the band, and the compression volume. The piston diameter, band diameter, and vertical placement are correlated so as to keep the bottom bellows loop relatively small and under close control. At the same time, no folds can be formed in the loop as the unit works because they would quickly destroy it.

When the piston face works within the constricting band throughout most of the operating cycle and the band diameter and piston diameter are correlated so as to provide a relatively tight or small loop in the bellows, the effective area v. deflection curve is usually and preferably a reversing curve. This is shown in FIG. 7 where curve A reverses throughout the middle range.

The pistons of the modifications of FIGS. 4–6 have straight sidewalls and base portions with greater diameters to provide for an increased effective area at full jounce. When an hourglass piston shape is used, as shown in the modifications of FIGS. 1–3 and FIG. 9, the effective area v. deflection (or spring height) curve is somewhat more markedly reversing than curve A of FIG. 7. The degree to which the effective area v. deflection curve reverses is determined by the path of the locus of radii of the bellows loop. The internal restrictor or piston, external restrictor or restraining band, the vertical relationship of the lower edge of the external restrictor to the piston and the diametral relationship between the piston (at the top) and the restraining band (at the bottom edge) all affect this path. The reversing area curve as shown by curve A is a generally distinguishing characteristic of units of the present invention. The term "effective area" is used in the art and is that figure resulting when the total load supported by the spring is divided by the air pressure. It is difficult, if not impossible, to measure the actual area supporting the load and hence this means is employed.

The action of the air spring unit of the present invention is designed for minimum disturbance of the car level. The ride height of the spring is maintained at the normal position by automatic height control valves which supply or exhaust the air as required by the vehicle load.

In regard to the characteristics of air springs, it should be noted that the automobile manufacturers are not in full agreement as to the ideal frequency or characteristics for such units and that each unit has to be tailored for each manufacturer. One of the principal advantages of the present invention is the fact that the characteristics of the unit can be readily altered and adopted to the requirements of each manufacturer while confining the external dimensions to the small space that is available.

It is to be understood that in accordance with the provisions of the patent statutes, variations and modifications of the invention herein shown and described may be made without departing from the spirit thereof.

This application is a continuation-in-part of application Serial No. 627,377 entitled "Air Spring" filed December 10, 1956, now abandoned.

Having thus described our invention, we claim:

1. An air spring in combination with a vehicle frame and undercarriage adapted to cushion and absorb shocks and vibrations resulting from relative motion between the frame and undercarriage comprising an elongated piston member mounted on one of said frame and undercarriage, said piston member having a face and a base and intermediate sidewalls, bellows made of rubberlike material sealed to the edge portions of the face of said piston member and to the other of said frame and undercarriage opposite the face of said piston member so as to define a main air chamber, a floating band surrounding said bellows and attached thereto which is substantially coextensive in length with said bellows, said piston and said band being proportioned so that loop portions are formed in said bellows adjacent and outside of said floating band, an auxiliary air chamber and an orifice providing substantially unrestricted communication between said auxiliary air chamber and said main air chamber, said piston member extending an appreciable distance inside of said band so that its face reciprocates therein throughout substantially all of the operating cycle, said piston member having outwardly flaring lateral dimensions at the base so as to increase the effective area as the piston approaches maximum deflection in compression, the minimum pressure in said main and auxiliary air chambers being 20 p.s.i.

2. An air spring in combination with a vehicle frame and undercarriage adapted to cushion and absorb shocks and vibrations resulting from relative motion between the frame and undercarriage comprising an elongated piston member mounted on the undercarriage, said piston member having a face and a base and intermediate sidewalls, bellows made of rubberlike material sealed to the edge portions of the face of said piston member and to the frame substantially opposite said face to define a main air chamber, a floating cylindrical band surrounding said bellows and attached thereto which is substantially coextensive in length with said bellows, said piston and floating band being proportioned so that loop portions are formed in said bellows adjacent and outside of said floating band, an auxiliary air chamber and an orifice providing substantially unrestricted communication between said auxiliary air chamber and said main air chamber, said piston member extending an appreciable distance inside of said cylindrical band so that its face reciprocates therein throughout substantially all of the operating cycle, said piston member having outwardly flaring lateral dimensions at the base so as to increase the effective area as the piston approaches maximum deflection in compression, the minimum pressure in said main and auxiliary air chambers being 20 p.s.i.

3. An air spring in combination with a vehicle frame and undercarriage adapted to cushion and absorb shocks and vibrations resulting from relative motion between the frame and undercarriage comprising an elongated piston member mounted on the frame, said piston member having a face and a base and intermediate sidewalls, bellows made of rubberlike material sealed to the edge portions of the face of said piston member and to the undercarriage substantially opposite said face to define a main air chamber, a floating cylindrical band surrounding said bellows and attached thereto which is substantially coextensive in length with said bellows, said piston and floating band being proportioned so that loop portions are formed in said bellows adjacent and outside of said floating band, an auxiliary air chamber and an orifice providing substantially unrestricted communication between said auxiliary air chamber and said main air chamber, said piston member extending an appreciable distance inside of said cylindrical band so that its face reciprocates therein throughout substantially all of the operating cycle, said piston member having outwardly flaring lateral dimensions at the base so as to increase the effective area as the piston approaches maximum deflection in compression, the minimum pressure in said main and auxiliary air chambers being 20 p.s.i.

4. An air spring in combination with a vehicle frame and undercarriage adapted to cushion and absorb shocks and vibrations resulting from relative motion between the frame and undercarriage comprising an elongated piston member mounted on one of said frame and undercarriage, said piston member having a face, bead seats formed in the edge portions of the face, a base and intermediate sidewalls, bellows made of rubberlike material having bead portions which have an air-tight seal with the bead seats in the face of said piston member and the other of said frame and undercarriage opposite the face of said piston member so as to define a main air chamber, a floating band surrounding said bellows and attached thereto which is substantially coextensive in length with said bellows, said piston and floating band being proportioned so that loop portions are formed in said bellows adjacent and outside of said floating band, an auxiliary air chamber and an orifice providing substantially unrestricted communication between said auxiliary air chamber and said main air chamber, said piston member extending an appreciable distance inside of said band so that its face reciprocates therein throughout substantially all of the operating cycle, the sidewalls of said piston member being inwardly relieved between the face and the base and flaring outwardly at the base so as to increase the effective area as the piston approaches maximum deflection in compression.

5. An air spring in combination with a vehicle frame and undercarriage characterized by the fact that the effective area v. deflection curve for the unit reverse in the normal operative range as it approaches full jounce comprising an elongated piston member mounted on the undercarriage, said piston member having a face and a base and intermediate inwardly relieved sidewalls, bellows made of rubberlike material sealed to the edge portions of the face of the piston member and to the frame substantially opposite said face to define a main air chamber, a floating, cylindrical restrictor surrounding said bellows and positioned on the periphery thereof which is substantially coextensive in length with said bellows, said bellows having annular rolling loop portions formed therein outwardly from the edges of said cylindrical restrictor, an auxiliary air chamber and an orifice providing substantially unrestricted communication between said auxiliary air chamber and said main air chamber, the minimum pressure in said air chambers being 20 p.s.i., said piston member extending an appreciable distance inside of said cylindrical restrictor so that its face reciprocates therein throughout substantially all of the operating cycle and the loop portions formed in the bellows outside the restrictor are controlled and relatively tight.

References Cited in the file of this patent

UNITED STATES PATENTS

| 971,583 | Bell | Oct. 4, 1910 |
| 1,177,142 | Rudd | Mar. 28, 1916 |
| 1,242,431 | Foster | Oct. 9, 1917 |
| 2,725,078 | Glancy | Nov. 29, 1955 |
| 2,901,242 | Elliott et al. | Aug. 25, 1959 |
| 2,933,308 | McGavern et al. | Apr. 19, 1960 |
| 2,950,104 | Bowser et al. | Aug. 23, 1960 |

FOREIGN PATENTS

| 400,616 | Great Britain | Oct. 24, 1933 |